(12) United States Patent
Hollatz

(10) Patent No.: US 9,474,211 B2
(45) Date of Patent: Oct. 25, 2016

(54) CONSTANT TENSIONING MEANS FOR ROTARY MOTION TRANSFER APPARATUS

(71) Applicant: LAVERDA SPA, Hesston, KS (US)

(72) Inventor: Brian Jay Hollatz, Bassano delGrappa (IT)

(73) Assignee: LAVERDA SPA, Breganze (IT)

(*) Notice: Subject to any disclaimer, the term of this patent is extended or adjusted under 35 U.S.C. 154(b) by 0 days.

(21) Appl. No.: 14/654,011

(22) PCT Filed: Nov. 22, 2013

(86) PCT No.: PCT/EP2013/074492
§ 371 (c)(1),
(2) Date: Jun. 19, 2015

(87) PCT Pub. No.: WO2014/095225
PCT Pub. Date: Jun. 26, 2014

(65) Prior Publication Data
US 2015/0344230 A1    Dec. 3, 2015

(30) Foreign Application Priority Data

Dec. 21, 2012    (GB) .................................. 1223549.5

(51) Int. Cl.
*A01F 12/46*    (2006.01)
*B65G 23/24*    (2006.01)
(Continued)

(52) U.S. Cl.
CPC .............. *A01F 12/46* (2013.01); *B65G 23/24* (2013.01); *B65G 23/44* (2013.01); *F16H 7/12* (2013.01); *F16H 7/1281* (2013.01); *F16H 2007/0808* (2013.01); *F16H 2007/0893* (2013.01)

(58) Field of Classification Search
CPC ....... B65G 23/24; B65G 23/44; A01F 12/46; A01F 12/56; A01F 17/02; F16H 7/12; F16H 7/1281; F16H 2007/0808; F16H 2007/0893
See application file for complete search history.

(56) References Cited

U.S. PATENT DOCUMENTS

| | | | | |
|---|---|---|---|---|
| 1,387,849 A | * | 8/1921 | Grass ..................... | B65G 23/44 198/815 |
| 1,954,508 A | * | 4/1934 | Winter ................... | B65G 23/44 198/709 |

(Continued)

FOREIGN PATENT DOCUMENTS

| | | |
|---|---|---|
| EP | 0189735 A1 | 8/1986 |
| EP | 1493692 A1 | 1/2005 |

(Continued)

OTHER PUBLICATIONS

EU International Searching Authority, International Search Report for International Patent Application No. PCT/EP2013/074492, mail date Feb. 19, 2014.

(Continued)

*Primary Examiner* — Robert Pezzuto
*Assistant Examiner* — Adam Behrens

(57) ABSTRACT

A rotary motion transfer apparatus, such as a combine grain elevator, which includes first and second endless flexible members which may include belts and/or chains. Each flexible member is trained around a respective set of rotary members which may be pulleys, sheaves or sprockets. One rotary member from each set shares a common shaft and may, or may not, be in driving engagement with one another. The common shaft is mounted on an adjustment frame member that is linearly displaceable with respect to a main frame to adjust the tension in the first endless flexible member. A pair of idler rotary members are provided for tensioning the second endless flexible member and are mounted on a pivot arm which is mounted to the adjustment frame member for pivoting movement around a pivot axis intermediate the pair of idler rotary members. A lever is secured to the pivot arm, and spring means are attached between the lever and the main frame to bias the idler rotary members into engagement with opposite sides of the second endless flexible member with a substantially constant force over an adjustment range of the common shaft.

9 Claims, 2 Drawing Sheets

(51) Int. Cl.
  *B65G 23/44* (2006.01)
  *F16H 7/12* (2006.01)
  *F16H 7/08* (2006.01)

(56) References Cited

U.S. PATENT DOCUMENTS

| | | | | |
|---|---|---|---|---|
| 2,623,630 | A * | 12/1952 | Erickson | B65G 23/44 192/125 A |
| 3,500,989 | A * | 3/1970 | Cripe | B65G 21/18 198/778 |
| 3,587,336 | A * | 6/1971 | Peak | F16H 7/1281 474/134 |
| 3,613,691 | A * | 10/1971 | Wilshusen | A01F 12/442 460/75 |
| 3,817,114 | A * | 6/1974 | Klee | F16H 7/1281 474/110 |
| 4,372,440 | A * | 2/1983 | Ringis | B65G 23/44 198/728 |
| 5,108,249 | A * | 4/1992 | Kinzenbaw et al. | B60P 1/38 414/519 |
| 5,776,025 | A * | 7/1998 | Labudde et al. | F16H 7/1281 474/133 |
| 5,863,247 | A * | 1/1999 | Behnke et al. | A01D 41/1271 460/114 |
| 5,865,020 | A | 2/1999 | Busboom et al. | |
| 6,220,425 | B1 * | 4/2001 | Knapp | B65G 17/126 198/709 |
| 6,959,803 | B1 * | 11/2005 | Layne et al. | B65G 17/08 198/600 |
| 7,913,479 | B2 * | 3/2011 | Eavenson, Sr. | A01D 34/76 474/135 |
| 8,851,276 | B2 * | 10/2014 | Strieker | B65G 15/60 198/810.04 |
| 2003/0224889 | A1 * | 12/2003 | Luh | F16H 7/1281 474/134 |
| 2005/0189201 | A1 * | 9/2005 | Schlagel | B65G 23/44 198/816 |
| 2008/0173521 | A1 * | 7/2008 | Hitch | B65G 15/42 198/698 |
| 2008/0289935 | A1 * | 11/2008 | Hesketh | B65G 23/44 198/813 |
| 2008/0302075 | A1 * | 12/2008 | Eavenson, Sr. | A01D 34/76 56/11.6 |
| 2013/0277178 | A1 * | 10/2013 | Strieker | B65G 15/60 198/813 |

FOREIGN PATENT DOCUMENTS

| | | |
|---|---|---|
| GB | 1228283 A | 4/1971 |
| JP | H0989058 A | 3/1997 |
| JP | 2007151448 A | 6/2007 |

OTHER PUBLICATIONS

Intellectual Property Office, International Search Report for UK Patent Application No. GB12235495, dated Jul. 23, 2013.

* cited by examiner

CONSTANT TENSIONING MEANS FOR ROTARY MOTION TRANSFER APPARATUS

FIELD OF INVENTION

The invention relates to rotary transfer apparatus comprising endless flexible members including belts and chains. In particular, the invention relates to the tensioning of such endless flexible members to accommodate wear and geometric changes upon adjustment actions.

BACKGROUND

The use of belts and chains to transfer rotary motion in mechanical drive systems is well known. However, despite the maturity of the technology, belts and chains alike suffer from wear and tend to stretch throughout their operational life. To maintain a desired tension in the belts or chains, various known tensioning mechanisms exist today.

In one approach, the position of the sprockets, pulleys of sheaves can be adjusted to change the geometry of the chain or belt's path. Adjustable idler sprockets or pulleys can be included in the path of the chain or belt to adjust the effective length and thus the tension. Idler wheels can be mounted in a spring-loaded manner so as to constantly bias the idler into engagement with the chain or belt with a force dictated by the spring. Such a tensioning mechanism accommodates wear in the chain or belt without adjustment. In practice, one or more of the known tensioning methods may be adopted in the same drive system.

United Kingdom patent application GB-1,228,283 discloses a drive mechanism on a combine harvester having a belt drive for a clean grain elevator. The belt drive includes a lower driving run and an upper driven run. A tensioning mechanism in the form of a pair of idlers mounted on a spring-loaded pivot arm is provided for the upper belt. An intermediate shaft is free to pivot to allow the tensioning of the upper belt to transfer to the lower belt also.

Although not discussed in GB-1,228,283, the tensioning of clean grain elevators is cumbersome in known combine harvesters. Such grain elevators typically include a chain with conveyor elements trained around a pair of sprockets which define the upper and lower limits of the conveyor. One sprocket is driven whilst the other sprocket idles. It is preferred that the sprocket at the discharge end of the conveyor is driven rather than the intake end because the operating tension in the chain under load only impacts on one side of the conveyor run. Therefore, in a grain conveyor, the upper sprocket is normally driven.

The provision of additional idler sprockets in the linear elevator housing is not practical and so tensioning is typically done through longitudinal adjustment of one of the two sprockets around which the chain elevator is trained. In most grain conveyors, the upper sprocket lends itself better to adjustment than the lower sprocket because the latter has an associated transverse auger with critical clearances driven from the same shaft.

The linear adjustment of the driven sprocket brings with it some challenges, most notably the need to also maintain the desired tension in the belt or chain used to drive the conveyor. Therefore, the adjustment of the conveyor tension requires also an adjustment of the drive belt or pulley resulting in a rather cumbersome multistep process for the operator.

One approach to reduce the effect of adjusting the conveyor tension on the drive belt or chain tension would be to align the drive belt or chain perpendicular to the adjustment of the conveyor. However, this is rarely practical on a machine with limited available space.

SUMMARY OF INVENTION

It is therefore an object of the invention to provide an improved rotary motion transfer apparatus wherein a shaft shared between two endless flexible members can be adjusted by linear displacement without additional tensioning steps.

In accordance with the invention there is provided rotary motion transfer apparatus comprising a main frame, first and second endless flexible members each trained around a respective set of rotary members, one rotary member from each set of rotary members sharing a common shaft which is mounted on an adjustment frame member that is linearly displaceable with respect to the main frame to adjust the tension in the first endless flexible member, a pair of idler rotary members for tensioning the second endless flexible member and mounted on a pivot arm which is mounted to the adjustment frame member for pivoting movement around a pivot axis intermediate the pair of idler rotary members, a lever secured to the pivot arm, and spring means attached between the lever and the main frame to bias the idler rotary members into engagement with opposite sides of the second endless flexible member with a substantially constant force over an adjustment range of the common shaft.

By mounting the pivot arm for the double idler on the adjustment frame member and connecting the spring to the main frame, the tensioning force placed upon the second endless flexible member can be substantially constant as the adjustment frame member and the common shaft is adjusted. Advantageously, this avoids the need for an additional tensioning action for the second belt or chain when the first belt or chain is adjusted.

It should be understood that the term "endless flexible member" is intended to include both belts and chains alike suitable for transferring rotary motion. Furthermore, the term "rotary members" is intended to include sprockets, pulleys and sheaves around which the belts and chains are trained.

In a preferred arrangement said one rotary member from each set of rotary members are in driving engagement with one another. In this case, the first and second endless flexible members are in driving connection with one another. Normally, this will include one driving belt or chain and one driven belt or chain wherein torque is transferred from one rotary member to the other via the shared (or common) shaft.

In an alternative arrangement which benefits from the advantages of the invention, the first and second endless flexible members are independent of one another but share a common shaft. Linear adjustment of the common shaft can be made without overly affecting the tension in the second belt or chain.

The spring means preferably comprises a coil spring in tension. Alternatively, the spring means may comprise a coil spring in compression or a pressurised pneumatic cylinder by way of example.

In an example embodiment the first endless flexible member is a chain trained around a set of sprockets, and the second endless flexible member is a belt trained around a set of pulleys. The set of pulleys preferably includes a drive pulley mounted to the main frame and deriving torque from a prime mover, the torque being transferred to the set of sprockets to drive the chain.

Although the invention has application in any rotary motion transfer apparatus that includes a pair of endless flexible members sharing a common shaft, the invention lends itself particularly well to belt-driven chain conveyors such as grain conveyors of combine harvesters. In an example grain conveyor the first endless flexible member is a chain with conveyance members trained around an upper sprocket and a lower sprocket and is located in an upright linear grain elevator housing. The second endless flexible member is preferably a belt trained around a set of pulleys, and the upper sprocket is mounted on said common shaft and is driven by the belt.

A combine harvester embodying the invention may further comprise a manual adjustment mechanism comprising an elongated member secured for rotation on its axis at a lower end to the main frame and at an upper end to the adjustment frame member, wherein manual rotation of the elongated member moves the adjustment frame relative to the main frame and thus adjusts the tension of the chain.

BRIEF DESCRIPTION OF DRAWINGS

Further advantages of the invention will become apparent from reading the following description of a specific embodiment with reference to the appended drawings in which.

DETAILED DESCRIPTION OF SPECIFIC EMBODIMENT

Figure 1:
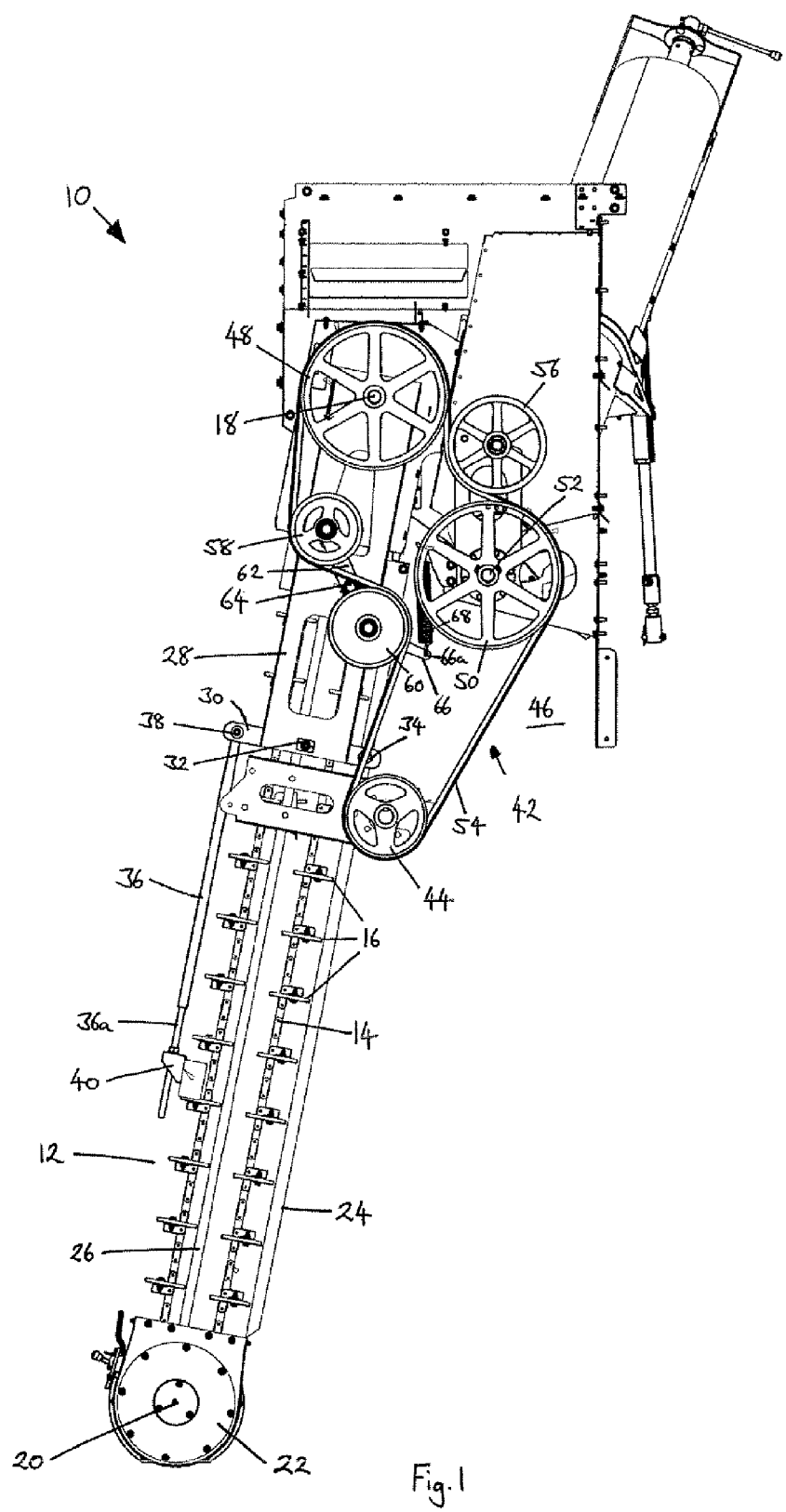
FIG. 1 is a side elevation view of a clean grain elevator system on a combine harvester in accordance with an embodiment of the invention.

With reference to FIG. 1, a clean grain elevator system 10 is shown. It should be appreciated that part of the elevator housing has been omitted from FIG. 1 to illustrate the inner workings. The elevator system 10 forms part of a larger grain conveyance system of a combine harvester which will not be described in any detail. A transverse clean grain auger (not shown and aligned perpendicular to the plane of the drawing) delivers clean grain separated from a crop stream to the bottom of upright elevator 12.

An endless chain 14, which includes conveyance paddles 16 at regular intervals along the length thereof, is trained around upper and lower sprockets (not shown) which rotate on an upper shaft 18 and a lower shaft 20 respectively. The clean grain auger rotates on the same axis 20 as the lower sprocket. The clean grain is delivered into a lower housing 22 where it is engaged by the paddles 16 for upward conveyance.

The chain 14 resides in a tubular housing 24 of substantially rectangular section. An upright dividing wall 26 separates the upward conveyance run on the rear side from the 'empty' return run on the front side. The clean grain is conveyed upwardly by the paddles 16 and delivered to an upper transverse auger (not shown) which rotates on the same axis 18 as the upper sprocket and which carries the grain to the on-board tanks.

Due to wear and stretch with age and use, the chain 14 must be tightened from time-to-time. Coarse adjustments must be made by removing links whereas finer adjustments can be made by altering the distance between the upper and lower sprockets. In the system 10 described, the lower sprocket is fixed in position whilst adjustments are made via movement of the upper sprocket.

The upper shaft 18 is journalled to an adjustment frame 28 which includes a pair of parallel plates disposed on opposing sides of the upper part of elevator housing 24. It should be understood that the figures show only one plate as the other is hidden from view by the elevator. Both plates of the adjustment frame 28 are supported at the bottom by a respective lever 30 to which the associated plate is pivotally attached at 32. Again, it should be understood that only one lever 30 is shown.

Each lever 30 is pivotally connected to the elevator housing 24 to allow pivoting movement around a transverse axis 34 on the front side thereof. At the rear side, both levers 30 are pivotally secured to an adjustment rod 36 to allow pivoting movement around transverse axis 38. Adjustment rod 36 includes a threaded section 36a which is in threaded engagement with bracket 40 secured to the elevator housing 24.

By manual rotation of adjustment rod 36, the adjustment frame 28, and thus upper shaft 18, is moved in a linear direction to tighten (or loosen) the chain 14. Suitable guides (not shown) are provided to ensure the degree of freedom of movement of adjustment frame 28 is linear, thus keeping the conveyor aligned within the housing 24.

The elevator 12 is driven through upper shaft 18 with torque conveyed by belt and pulley system designated generally at 42 and disposed on the outside of the elevator housing 24. A drive pulley 44 is secured to the main frame of the combine (designated generally at 46) on an axis located forward of the elevator and below the upper shaft 18. A driven pulley 48 is keyed to the upper shaft 18. Specific to this embodiment, an auxiliary driven pulley 50 is mounted for rotation on an shaft 52 which serves to drive another auger (not shown) separate from the elevator. It should be understood that alternative constructions may omit auxiliary pulley 50 without deviating from the scope of the invention.

Friction belt 54 of a known type is trained around pulleys 44, 48 and 50. Idler pulley 56 is specific to this embodiment and serves to increase the proportion of contact between the belt 54 and auxiliary pulley 50.

A belt tensioning mechanism is provided by a pair of idler pulleys 58, 60 which are mounted for rotation on opposite ends of a pivot arm 62 which itself is pivotally mounted, intermediate the idler pulleys 58, 60, to the adjustment frame 28 for pivoting movement around axis 64. The belt 54 passes around the underside of rearmost idler pulley 58 and over the top of forward-most idler pulley 60.

The pivot arm 62 has a lever 66 secured to one end thereof. The lever 66 extends forwardly beyond the forward-most idler pulley 60 and includes a hole 66a which allows attachment of a coil spring 68. The other end of spring 68 is attached to a bracket on the main frame 46.

The parameters of the spring 68 are selected so that it rests in tension and provides the moment on the pivot arm 62, via the lever 66, to engage the idler pulleys 58, 60 with the belt 54, and thus tension the belt 54.

Figure 2:
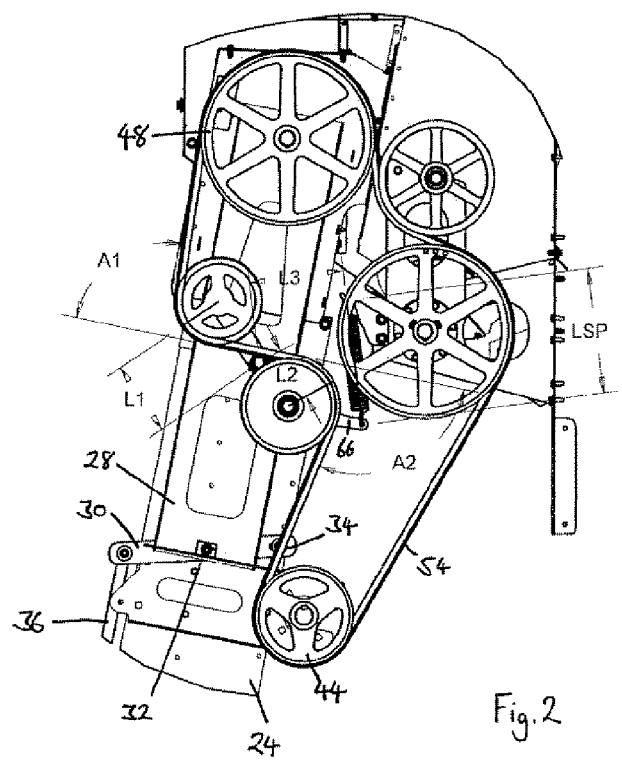
FIG. 2 shows part of the elevator system of FIG. 1 with the elevator in one adjustment position; and, FIG. 3 shows part of the elevator system of FIG. 1 with the elevator in a second adjustment position.
Figure 3:
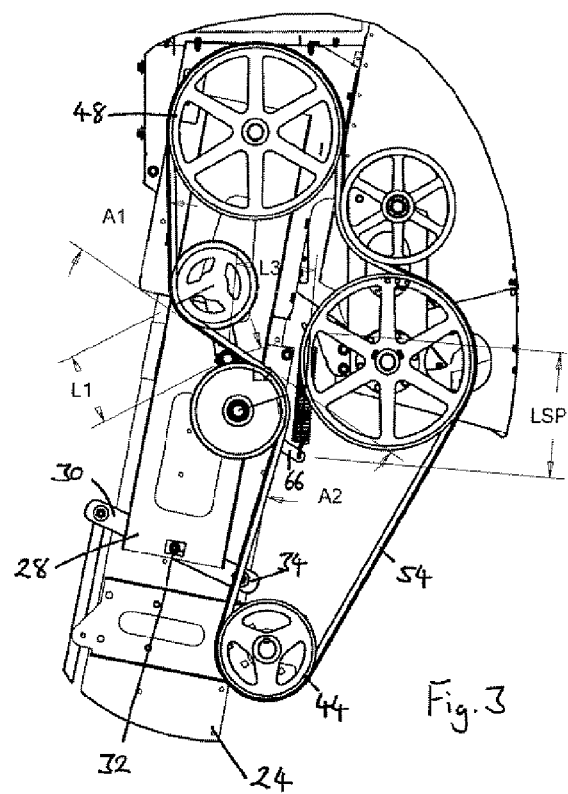

With reference to FIGS. 2 and 3, the tensioning force applied to the belt 54 is dependent upon the length of the spring 68 (LSP), dimensions L1, L2, L3, and angles A1 and A2. As the elevator chain 14 is adjusted from minimum length (FIG. 2) to maximum length (FIG. 3), the adjustment frame 28 slides upward with respect to the elevator housing 24 and main frame 46. Carried by the adjustment frame 28 and pivot arm 62, the double idler pulleys 58, 60 also move upward as the elevator chain is 14 adjusted, but are free to pivot around axis 64. Dimensions L1 and L2 change very little whilst L3 decreases substantially. As the pivot arm 62 swings, angles A1 and A2 decrease substantially whilst the spring length LSP remains substantially constant.

The change in dimension L3 compensates for the reduction in angles A1 and A2 to maintain the same tension with the same spring force.

The motion of the pivot arm 62 and idler pulleys 58, 60 together with the adjustment frame 28 while the upper spring attachment remains fixed to the main frame 46 allows the take up of slack of the belt 54 without appreciably increasing the length of the spring thus avoiding over-tensioning of the latter.

Advantageously, the belt and the spring never need to be adjusted when the chain length is adjusted.

The above-described system 10 comprises two endless flexible members in the form of a driven chain 14 and a driving belt 54. However, it is envisaged that the principals of the invention can be applied to any system having one endless flexible member driving another endless flexible member via a common shaft which is adjustable with a linear degree of freedom.

Although utilising a coil spring in tension, it is envisaged that alternative spring means may be employed instead. For example a coil spring in compression or a pressurised pneumatic cylinder may be employed provided an adequate tensioning force is applied to the second endless flexible member (belt 54 in the described embodiment) via the lever 66.

Alternative adjustment frame constructions will be envisaged by the skilled person which remain within the scope of the invention, namely the mutual connection between the mount for the upper shaft 18 and the pivoting mount 64 for the pivot arm 62.

Although described in relation to an elevator system 10 on a combine harvester, it should be understood that the invention has application in other rotary motion transfer apparatus employing two endless flexible members. The field of application is thus wide ranging but may include, by way of example only, standalone grain conveyors, mining machinery and agricultural balers.

The invention claimed is:

1. Rotary motion transfer apparatus comprising:
   a main frame;
   first and second endless flexible members each trained around a respective set of rotary members, wherein one rotary member from each set of rotary members shares a common shaft;
   an adjustment frame member mounted to the main frame, wherein the common shaft is mounted on the adjustment frame member, and wherein the adjustment frame member, together with the common shaft, is linearly displaceable with respect to the main frame along a linear degree of freedom of movement to adjust the tension in the first endless flexible member;
   a pair of idler rotary members for tensioning the second endless flexible member and mounted on a pivot arm which is mounted to the adjustment frame member for linear displacement together with the adjustment frame member, and for pivoting movement around a pivot axis intermediate the pair of idler rotary members;
   a lever secured to the pivot arm; and
   a spring attached between the lever and the main frame to bias the idler rotary members into engagement with opposite sides of the second endless flexible member.

2. Rotary motion transfer apparatus according to claim 1, wherein said one rotary member from each set of rotary members are in driving engagement with one another.

3. Rotary motion transfer apparatus according to claim 2, wherein the second endless flexible member is driven by a drive rotary member and transfers torque to the first endless flexible member via the common shaft.

4. Rotary motion transfer apparatus according to claim 1, wherein the spring comprises a coil spring in tension.

5. Rotary motion transfer apparatus according to claim 1, wherein the first endless flexible member is a chain trained around a set of sprockets, and wherein the second endless flexible member is a belt trained around a set of pulleys.

6. Rotary motion transfer apparatus according to claim 5, wherein the set of pulleys includes a drive pulley mounted to the main frame and deriving torque from a prime mover, the torque being transferred to the set of sprockets to drive the chain.

7. Grain conveyor apparatus comprising:
   a main frame;
   a chain with conveyance members trained around an upper sprocket and a lower sprocket;
   a belt trained around a set of pulleys, wherein one of said upper and lower sprockets and one of said pulleys shares a common shaft;
   an adjustment frame member mounted to the main frame, wherein the common shaft is mounted on the adjustment frame member, and wherein the adjustment frame member, together with the common shaft, is linearly displaceable with respect to the main frame along a linear degree of freedom of movement to adjust the tension in the chain;
   a pair of idler pulleys for tensioning the belt and mounted on a pivot arm which is mounted to the adjustment frame member for linear displacement together with the adjustment frame member, and for pivoting movement around a pivot axis intermediate the pair of idler pulleys;
   a lever secured to the pivot arm; and
   a spring attached between the lever and the main frame to bias the idler pulleys into engagement with opposite sides of the belt, wherein the chain is located in an upright linear grain elevator housing.

8. A combine harvester comprising a clean grain conveyor comprising:
   a main frame;
   an upright linear grain elevator housing;
   a chain located in the housing and comprising conveyance members trained around an upper sprocket and a lower sprocket; and
   a belt trained around a set of pulleys, wherein said upper sprocket and one of said pulleys shares a common shaft;
   an adjustment frame member mounted to the main frame, wherein the common shaft is mounted on the adjustment frame member, and wherein the adjustment frame member, together with the common shaft, is linearly displaceable with respect to the main frame along a linear degree of freedom of movement to adjust the tension in the chain;
   a pair of idler pulleys for tensioning the belt and mounted on a pivot arm which is mounted to the adjustment frame member for linear displacement together wi the adjustment frame member, and for pivoting movement around a pivot axis intermediate the pair of idler pulleys;
   a lever secured to the pivot arm; and
   a spring attached between the lever and the main frame to bias the idler pulleys into engagement with opposite sides of the belt.

9. A combine harvester according to claim 8, further comprising a manual adjustment mechanism comprising an adjustment rod with a threaded section secured for rotation at a lower end to the main frame and at an upper end to the adjustment frame member, wherein manual rotation of the adjustment rod moves the adjustment frame relative to the main frame and thus adjusts the tension of the chain.

\* \* \* \* \*